United States Patent [19]

Ochs et al.

[11] Patent Number: 5,562,544
[45] Date of Patent: Oct. 8, 1996

[54] TORSIONAL VIBRATION DAMPER

[75] Inventors: Winfried Ochs, Alsbach-Haehnlein; Jürgen Eichhorn, Weinheim, both of Germany

[73] Assignee: Firma Carl Freudenberg, Germany

[21] Appl. No.: 225,208

[22] Filed: Apr. 8, 1994

[30] Foreign Application Priority Data

Apr. 10, 1993 [DE] Germany ............... 43 11 939.5

[51] Int. Cl.$^6$ ............................................. F16F 15/12
[52] U.S. Cl. ................................. 464/89; 74/574
[58] Field of Search ........................ 464/89, 90, 180, 464/147, 150; 74/574, 573 R

[56] References Cited

U.S. PATENT DOCUMENTS

| | | | |
|---|---|---|---|
| 2,594,555 | 4/1952 | Hardy | 74/574 |
| 2,723,573 | 11/1955 | Dillman | 74/574 |
| 3,479,907 | 11/1969 | Hall | 74/574 |
| 4,172,510 | 10/1979 | Forkel | 74/574 X |
| 4,710,152 | 12/1987 | Ichikawa et al. | 74/573 R X |
| 4,728,314 | 3/1988 | Eckel et al. | 74/574 X |
| 4,848,183 | 7/1989 | Ferguson | 74/574 |
| 5,139,120 | 8/1992 | Gomi | 74/574 X |
| 5,308,289 | 5/1994 | Funahashi | 74/574 X |

FOREIGN PATENT DOCUMENTS

| | | | |
|---|---|---|---|
| 58-77947 | 5/1983 | Japan | 74/574 |
| 58-146745 | 9/1983 | Japan | 74/574 |
| 4-151045 | 5/1992 | Japan | 74/574 |
| 5180267 | 7/1993 | Japan | 74/574 |

Primary Examiner—Daniel P. Stodola
Assistant Examiner—Eileen A. Dunn
Attorney, Agent, or Firm—Kenyon & Kenyon

[57] ABSTRACT

A torsional vibration damper in which a first inertial ring is arranged at least in part radially on the outside of an inner ring and is bonded to it by an intermediate ring of rubber, the intermediate ring resting axially against the inertial ring with the avoidance of gaps and adhesion, the inertial ring being bonded to the intermediate ring substantially only in the region of its inside diameter, and a belt travel ring being additionally bonded to the intermediate ring and surrounding the inertial ring radially on the outside at least in a partial region.

9 Claims, 3 Drawing Sheets

TORSIONAL VIBRATION DAMPER

BACKGROUND OF THE INVENTION

The present invention relates to a torsional vibration damper in which a first inertial ring is arranged at least in part radially on the outside of an inner ring and is bonded to it by an intermediate ring of rubber.

Such a torsional vibration damper is known from U.S. Pat. No. 5,058,267, corresponding to Federal Republic of Germany Patent 36 38 097. In that damper, the intermediate ring is arranged in the radial space between the inertial (or flywheel) ring and the inner ring and bonded with those rings only in the region of surfaces which lie radially opposite each other.

SUMMARY OF THE INVENTION

An object of the present invention is, while assuring compact construction, to provide such a torsional vibration damper with a belt travel ring which is adapted to absorb, when used in accordance with its purpose, large amplitudes of twist while avoiding substantial radial displacements.

This object is achieved in accordance with the invention by a torsional vibration damper of the aforementioned type which has the features set forth in the claims included herewith.

In the torsional vibration damper of the invention, the intermediate ring rests axially against the inertial ring, substantially with the avoidance of gaps and adhesion, and is bonded to a belt travel ring which surrounds the inertial ring radially on the outside at least in a part of its region. The intermediate ring has a greater radial extent in the intermediate zone between the belt travel ring and the inner ring than in the intermediate zone between the inertial ring and the inner ring. The relative turnability of the belt travel ring is thereby greater than that of the inertial ring. It is thus possible for rotary vibrations of large amplitude of rotation which are introduced via the belt travel ring to be isolated well and to dampen to a high extent rotary vibrations which act in the regions of the inner ring. In addition, the intermediate ring and the belt travel ring are provided with good guidance in radial and axial directions. As a result, large belt forces can be taken up by the belt travel ring without any substantial relative displacement in radial direction.

In accordance with one advantageous embodiment, a second inertial ring rests against the intermediate ring at the end facing axially away from the first inertial ring with the avoidance of gaps and adhesion, the inertial ring being bonded to the intermediate ring only in the region of its inside diameter. The damping of rotary vibrations effected by the first inertial ring is supplemented by the damping action of the second inertial ring. In addition, there is further improved guidance of the belt travel ring and of the intermediate ring in axial and radial directions.

The second inertial ring can have an inertial mass which differs from the first inertial ring. With such a development, it reaches its optimal damping action at a frequency which differs from the first inertial ring. If necessary, the resonant frequencies of the two inertial rings can be established so close to each other that, as a whole, a damping action which passes into each other is obtained within a comparatively enlarged range of frequencies.

A similar effect can be obtained when the bonding zones of the first and second inertial rings define annular projections of the intermediate ring which differ from each other by a different length and/or width.

In accordance with another embodiment, the inner ring may be provided on the end facing axially away from the inertial ring with a radially outwardly protruding support collar which lies loosely against the intermediate ring with the avoidance of gaps and adhesion. The resultant radial and axial guidance of the belt travel ring and of the intermediate ring is particularly good with such a development.

The intermediate ring can completely fill up the spaces between the belt travel ring, the inner ring and each inertial ring. In the case of such a development, its profile is supported on all sides by non-deformable machine parts with the result that the deformability of the intermediate ring is limited to deformations of proper amount. For obtaining good permanent stability and good relative turnability of the belt travel ring with respect to the inner ring, this is of great advantage.

The relative turnability of the belt travel ring can be further increased if the intermediate ring has a profile which, in the direction toward the middle region of a radial extent has an increasingly shortened length in axial direction.

In accordance with another embodiment, the contact surfaces which lie loosely against each other between the support collar, the first and second inertial rings, and the intermediate ring are lubricated by a lubricant. Wear caused by friction can thus be avoided and the useful life of the torsional vibration damper can be substantially improved. A supplementing of lost lubricant can be effected particularly easily in such embodiments if the support collar, the first inertial ring and/or second inertial ring are passed through by a lubricating opening which makes the region of the surface to be supplied with the lubricant accessible from the outside. The belt travel ring can be provided in the central region of its axial extent with a radially inwardly protruding guide ring having an inside diameter which is smaller than the outside diameter of the inertial rings and/or of the support collar. The axial guidance of the belt travel ring, with respect to the inner ring, can be further improved thereby.

The torsional vibration damper of the invention can be produced at particularly low cost in view of its simple construction. The belt travel ring is well supported in radial direction on the hub ring, which substantially excludes the occurrence of imbalance phenomena even with very high speeds of rotation. Nevertheless, torsional vibrations of the belt travel ring which have a great amplitude of twist are excellently isolated from the inner ring.

DETAILED DESCRIPTION OF THE ILLUSTRATED EMBODIMENTS

Figure 1:
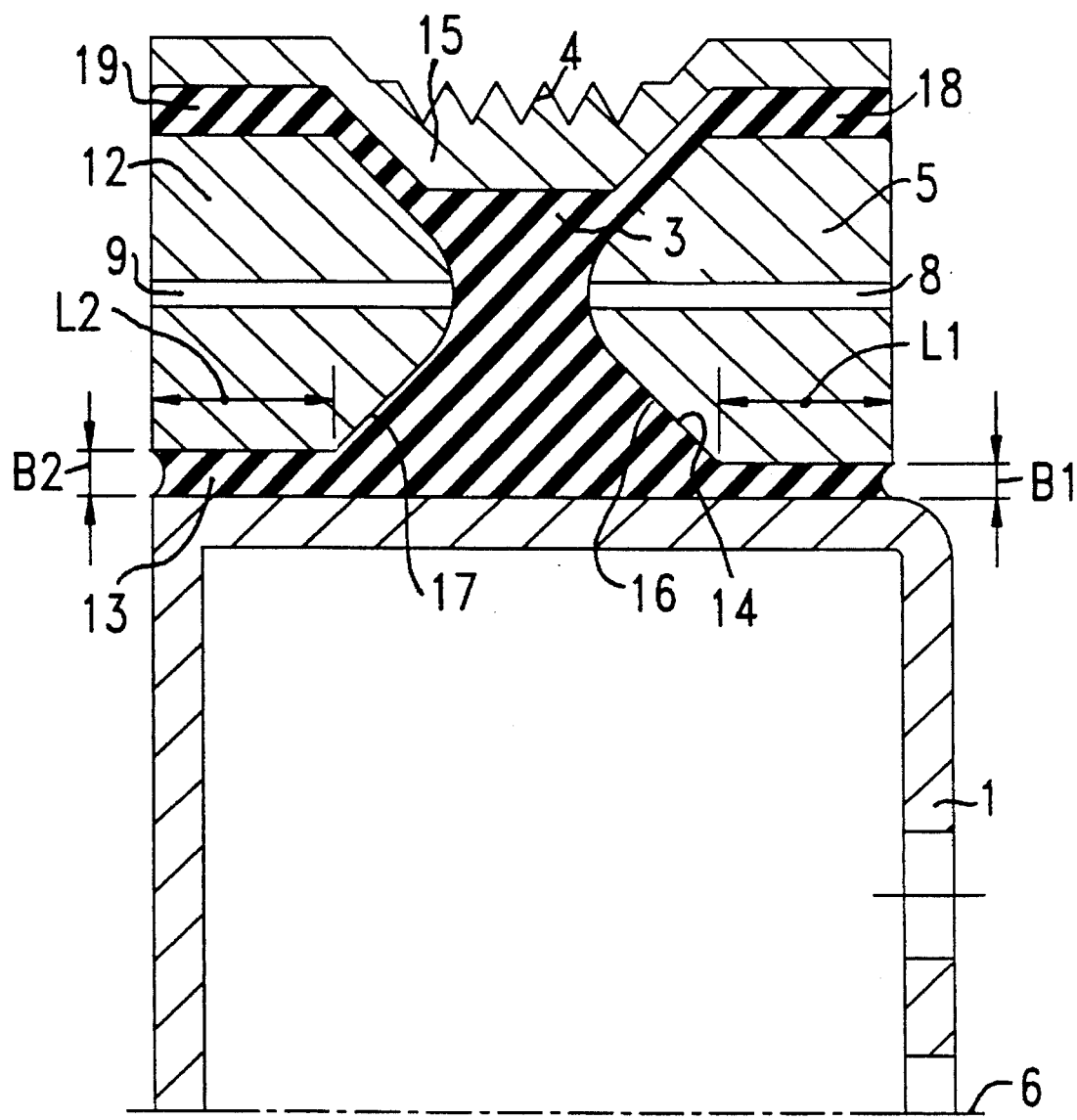
FIG. 1 shows a cross sectional view of a first embodiment of a torsional vibration damper.

The torsional vibration damper shown in FIG. 1 comprises a hub or inner ring 1 of pot shape which is produced of a metal material. The hub ring 1 is surrounded by a belt travel ring 4, which is also made of metallic material. The belt travel ring 4 is provided on its outer side with a travel track for a fine-toothed belt. It furthermore has a radially inwardly protruding guide ring 15 which is arranged approximately in the center of its axial length.

The radial space between the belt travel ring 4 and the inner ring 1 is limited in axial extent on both sides by a first damping or inertial ring 5 and a second damping or inertial ring 12. They are arranged at a distance from the belt travel ring 4 and the inner ring 1, the profile being so selected that the surface regions lying opposite each other extend parallel to each other and show no substantial changes in distance apart.

The first inertial ring 5 is at a smaller distance B1 from the inner ring 1 than the distance B2 between the inner ring 1 and the second inertial ring 12.

The available free spaces between the belt travel ring 4, the inner ring 1, and the two inertial rings 5, 12 are completely filled with elastomeric material, for instance rubber, with formation of the intermediate ring 3. The elastomeric material is fastened adhesively to the surface regions of the belt travel ring 4 which face inward in radial direction and to the surface regions of the inner ring 1 which face outward in radial direction. The inertial rings 5, 12 are, on the other hand, bonded to the intermediate ring 3 only in the region of their inner circumference. The corresponding regions of the intermediate ring are provided with reference numerals 13, 14 and with the indication of lengths L1, L2, which may differ from each other. In the other regions, the inertial rings 5, 12 lie loosely against the intermediate ring 3 with the avoidance of free spaces and adhesion. The intermediate ring 3 is thereby guided in the axial direction. The two inertial rings 5, 12 are passed through by lubricating openings 8, 9 which are accessible from the outside and terminate in the region between the inertial rings and the intermediate ring 3. Lubricant can thereby be introduced into the regions in question, which prevents the occurrence of friction-produced wear upon a relative turning of the intermediate ring 3 with respect to the inertial rings 5, 12.

The intermediate layers between the inertial rings 5, 12 and the belt travel ring 4 are of very slight thickness. For example, the intermediate layers may comprise rubber film layers 18, 19, comprising integral parts of the intermediate ring 3. In this way, metallic contact between the inertial rings and the belt travel ring is prevented. This is of great advantage with respect to the production and transmission of solid-borne noise.

The intermediate ring 3 has a symmetrically constricted profile in axial direction between its inner and outer diameters. The deformations of the intermediate ring 3 which result upon relative turning of the inner ring 1 with respect to the belt travel ring 4 can in this way be clearly determined in advance with respect to their size, which excludes damage. The axis of rotation of the torsional vibration damper is designated 6; the zones to be lubricated between the inertial rings 5, 12 and the intermediate ring 3 are designated 16, 17.

Figure 2:
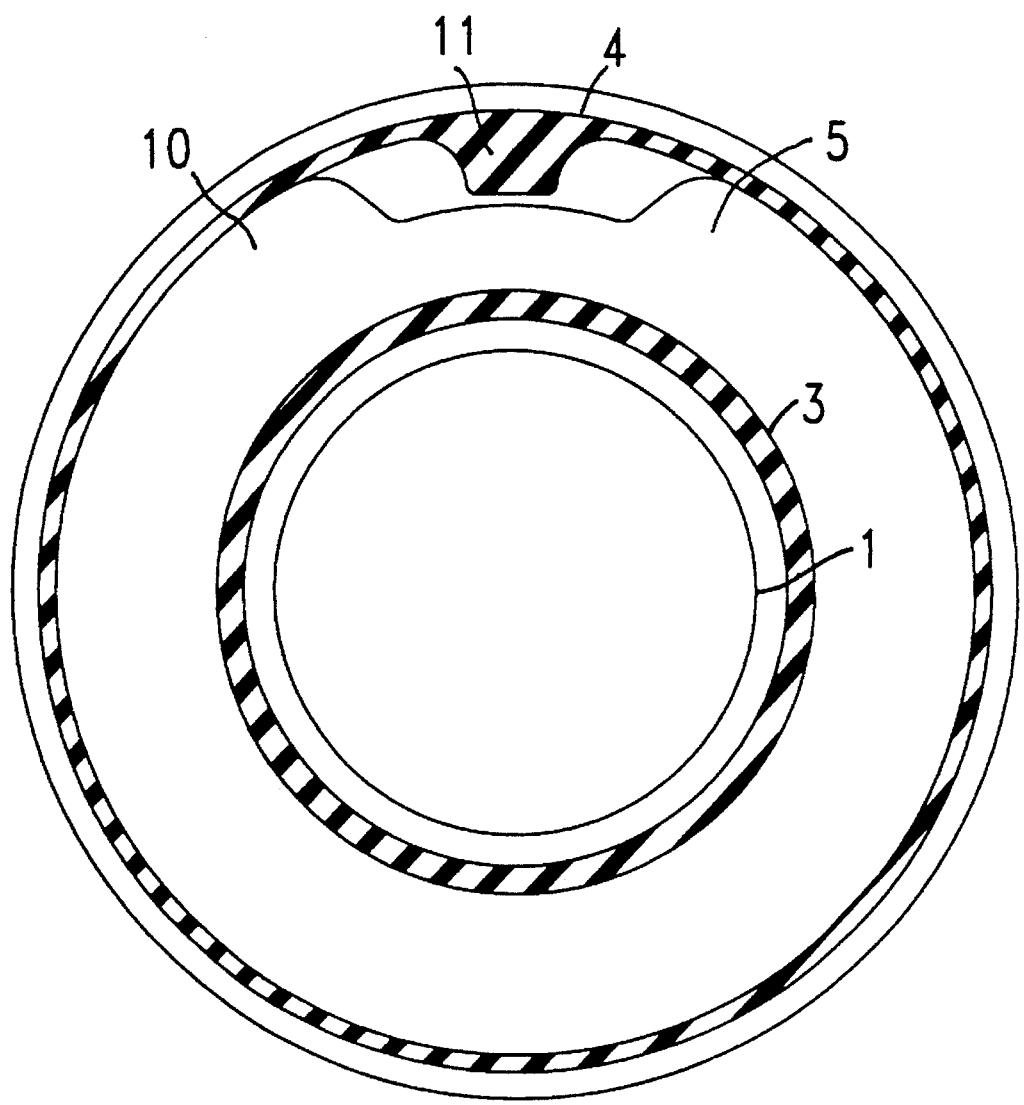
FIG. 2 is a front view of the torsional vibration damper of FIG. 1.

FIG. 2 shows the torsional vibration damper of FIG. 1 in a front view. It can be noted herein that the inertial rings 5, 12 are provided with radially outward protruding stops 10 which, upon the occurrence of an impermissibly high amplitude of twist, can be brought into engagement with mating stops 11. Damage to the torsional vibration damper caused by overload is thereby prevented.

Figure 3:
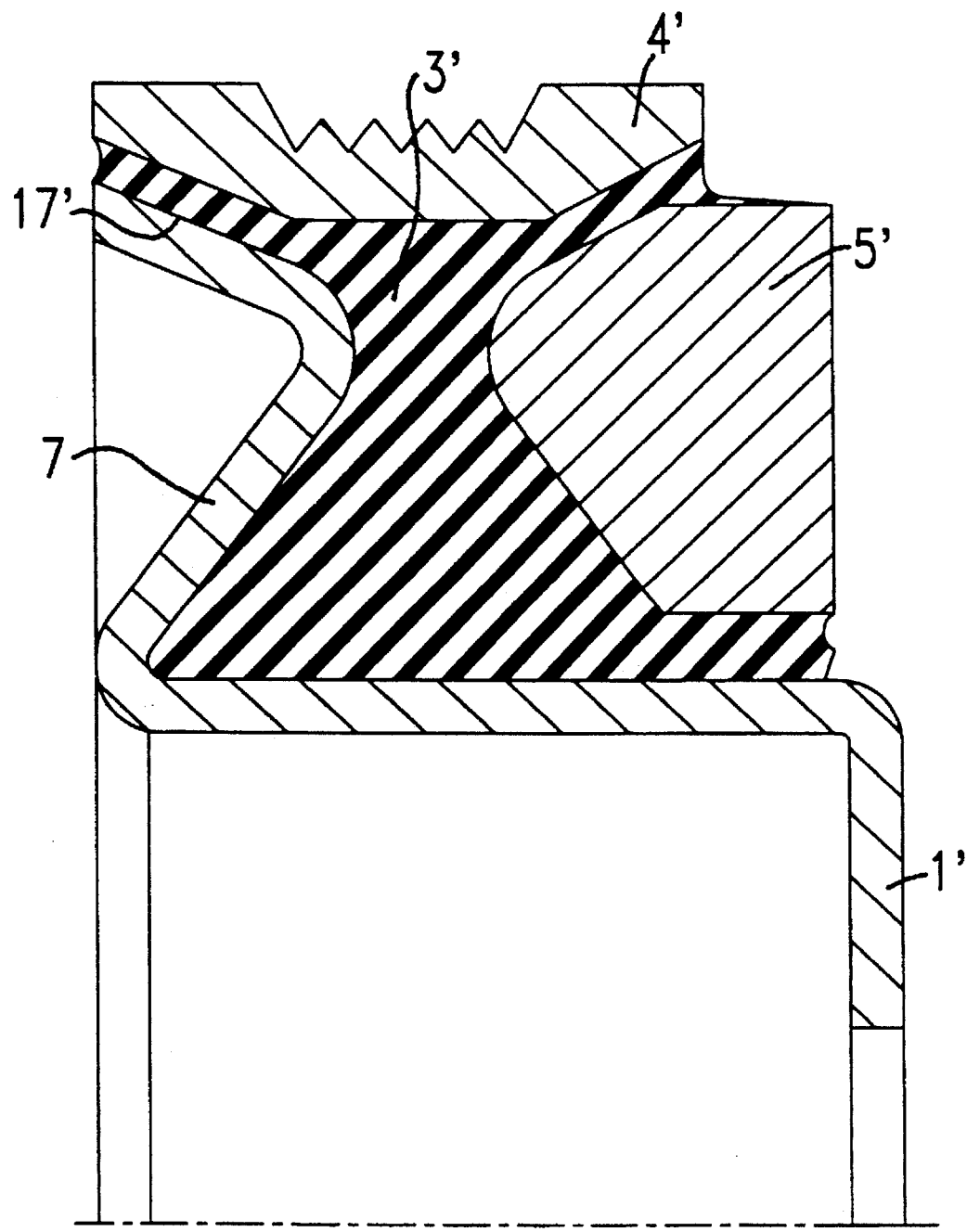
FIG. 3 shows a second embodiment of the torsional vibration damper of the invention.

In the case of the torsional vibration damper shown in FIG. 3, only one inertial ring 5' is present between the outer circumference of the inner ring 1' and the belt travel ring 4'. It limits the radial space between the belt travel ring 4' and the inner ring 1' axially in one direction. On the axially opposite side, the space is limited by a radially outwardly protruding support collar 7 of the inner ring 1'. The support collar 7 has a profile which mirrors the limiting surface of the inertial ring 5' lying opposite it. The intermediate ring 3' is arranged in the radial space between the belt travel ring 4' and the inner ring 1'. It is bonded to the inner ring 1' in the region of its inner diameter. Furthermore, the intermediate ring 3' is bonded to the entire radially inwardly facing side of the belt travel ring 4' and to the inertia ring 5 in the region of its inner diameter.

The intermediate ring 3' lies loosely against the surface regions of the support collar 7 and of the inertia ring 5' which are axially opposite each other, with the avoidance of gaps and adhesion. The inertial ring 5', the intermediate ring 3', and the belt travel ring 4' are thereby able to turn in the circumferential direction relative to each other, similar to the case of the embodiment described above. Nevertheless, the individual parts are imparted good guidance by each other.

What is claimed is:

1. A torsional vibration damper comprising a first inertial ring arranged at least in part radially on the outside of an inner ring, wherein the first inertial ring is mounted for rotation relative to the inner ring and is connected to the inner ring by an intermediate ring of rubber, wherein the intermediate ring rests axially against the first inertial ring, wherein the first inertial ring is bonded to the intermediate ring substantially only at an inside diameter of the first inertial ring, and wherein a belt travel ring is additionally bonded to the intermediate ring, the belt travel ring surrounding at least a part of the first inertial ring radially on the outside.

2. A torsional vibration damper according to claim 1, further comprising a second inertial ring, wherein the intermediate ring rests against the second inertial ring on an end of the intermediate ring facing axially away from the first inertial ring, and wherein the second inertial ring is bonded to the intermediate ring substantially only at an inside diameter of the second inertial ring.

3. A torsional vibration damper according to claim 2 wherein the second inertial ring has an inertial mass which differs from the first inertial ring.

4. A torsional vibration damper according to claim 2 wherein the area of bonding of the first and second inertial rings to the intermediate ring define first and second annular projections of the intermediate ring which differ from each other by a different length and/or width.

5. A torsional vibration damper according to claim 1, wherein the inner ring comprises, on an end facing axially away from the first inertial ring, a radially outwardly protruding support collar which lies loosely against the intermediate ring.

6. A torsional vibration damper according to claim 1 wherein at least one lubricating opening allows the introduction of lubricant into the regions in which the intermediate ring rests against the first inertial ring.

7. A torsional vibration damper according to claim 6, wherein the first inertial ring is passed through by a lubricating opening.

8. A torsional vibration damper according to claim 1 wherein the belt travel ring is separated from the first inertial ring by a rubber film layer which comprises an integral part of the intermediate ring.

9. A torsional vibration damper according to claim 1 wherein the belt travel ring is provided, approximately in the central region of its axial extent, with a radially inwardly protruding guide ring having an inside diameter which is smaller than the outside diameter of the first inertial ring.

* * * * *